(12) United States Patent
Bauer

(10) Patent No.: US 9,147,064 B2
(45) Date of Patent: Sep. 29, 2015

(54) METHOD FOR CARRYING OUT AN APPLICATION WITH THE AID OF A PORTABLE DATA STORAGE MEDIUM

(75) Inventor: Sven Bauer, Vaterstetten (DE)

(73) Assignee: GIESCKE & DEVRIENT GMBH, Munich (DE)

( * ) Notice: Subject to any disclaimer, the term of this patent is extended or adjusted under 35 U.S.C. 154(b) by 268 days.

(21) Appl. No.: 13/262,698

(22) PCT Filed: Mar. 31, 2010

(86) PCT No.: PCT/EP2010/054275
§ 371 (c)(1),
(2), (4) Date: Oct. 3, 2011

(87) PCT Pub. No.: WO2010/115795
PCT Pub. Date: Oct. 14, 2010

(65) Prior Publication Data
US 2012/0030745 A1    Feb. 2, 2012

(30) Foreign Application Priority Data
Apr. 6, 2009 (DE) .......................... 10 2009 016 532

(51) Int. Cl.
*G06F 21/35* (2013.01)
*G06F 21/34* (2013.01)
(Continued)

(52) U.S. Cl.
CPC .............. *G06F 21/35* (2013.01); *G06F 21/34* (2013.01); *G06F 21/42* (2013.01); *G06F 21/43* (2013.01);
(Continued)

(58) Field of Classification Search
CPC ..... G06Q 20/341; G06F 21/34; H04W 12/06; H04L 63/0853

USPC ............................................................ 726/9
See application file for complete search history.

(56) References Cited

U.S. PATENT DOCUMENTS 6,895,502 B1 * 5/2005 Fraser ........................... 713/168
7,127,236 B2 * 10/2006 Khan et al. .................. 455/414.1
(Continued)

FOREIGN PATENT DOCUMENTS

DE      102004046847     4/2006
WO         9519593       7/1995
(Continued)

OTHER PUBLICATIONS

Secure Payment with NFC Mobile Phone in the SmartTouch Project; Marc Pasquet et al.; IEEE; 2008.*
(Continued)

*Primary Examiner* — James Turchen
(74) *Attorney, Agent, or Firm* — Workman Nydegger

(57) ABSTRACT

A method for carrying out an application with the help of a portable data carrier, wherein the data carrier includes two separated communication interfaces. According to the method, a user transmits via a first terminal specified input data for processing by the application to a server via a first data connection between the first terminal and the server. Then, authentication data for authenticating the application based on the input data of the server are transmitted via a second data connection between the server and the data carrier which is connected via the first communication interface with the first terminal. The authentication data are then transmitted from the data carrier via a third data connection to the second terminal. The third data connection is realized by means of the second communication interface. Finally, upon confirmation of the authentication data by the user via the first or second terminal confirmation data to the server are transmitted via at least the first or second data connection, whereupon the server executes the application.

13 Claims, 1 Drawing Sheet

(51) Int. Cl.
- *G06F 21/42* (2013.01)
- *G06F 21/43* (2013.01)
- *G06Q 20/10* (2012.01)
- *H04L 9/32* (2006.01)
- *G06Q 20/34* (2012.01)
- *H04L 29/06* (2006.01)
- *H04W 12/06* (2009.01)

(52) U.S. Cl.
CPC .............. *G06Q 20/10* (2013.01); *H04L 9/3215* (2013.01); *H04L 9/3234* (2013.01); *H04L 63/08* (2013.01); *H04L 63/18* (2013.01); *G06F 2221/2103* (2013.01); *G06F 2221/2115* (2013.01); *G06F 2221/2119* (2013.01); *G06F 2221/2153* (2013.01); *G06Q 20/341* (2013.01); *H04L 63/0853* (2013.01); *H04L 2209/56* (2013.01); *H04W 12/06* (2013.01)

(56) References Cited

U.S. PATENT DOCUMENTS

| | | | | |
|---|---|---|---|---|
| 8,095,113 | B2* | 1/2012 | Kean et al. | 455/410 |
| 8,233,842 | B2* | 7/2012 | Symons | 455/41.1 |
| 8,341,083 | B1* | 12/2012 | Jain | 705/41 |
| 2002/0046185 | A1* | 4/2002 | Villart et al. | 705/64 |
| 2003/0087601 | A1 | 5/2003 | Agam et al. | |
| 2004/0019564 | A1* | 1/2004 | Goldthwaite et al. | 705/44 |
| 2005/0222961 | A1* | 10/2005 | Staib et al. | 705/64 |
| 2005/0269402 | A1* | 12/2005 | Spitzer et al. | 235/380 |
| 2006/0294023 | A1* | 12/2006 | Lu | 705/67 |
| 2008/0244720 | A1* | 10/2008 | Bartsch et al. | 726/9 |
| 2009/0104888 | A1* | 4/2009 | Cox | 455/410 |
| 2009/0137276 | A1* | 5/2009 | Baldischweiler et al. | 455/558 |
| 2009/0143104 | A1* | 6/2009 | Loh et al. | 455/558 |
| 2009/0265776 | A1* | 10/2009 | Baentsch et al. | 726/9 |
| 2010/0042760 | A1* | 2/2010 | Spitz et al. | 710/36 |
| 2011/0047593 | A1* | 2/2011 | Ausems et al. | 726/1 |
| 2011/0147451 | A1* | 6/2011 | Bakshi | 235/379 |
| 2012/0267437 | A1* | 10/2012 | Jain et al. | 235/492 |

FOREIGN PATENT DOCUMENTS

| | | |
|---|---|---|
| WO | 9600485 | 1/1996 |
| WO | 9944114 | 9/1999 |
| WO | 0154438 | 7/2001 |
| WO | 2008046575 | 4/2008 |

OTHER PUBLICATIONS

Near-Field Communication-Based Secure Mobile Payment Service; Kiran S. Kadambi et al.; Aug. 12-15, 2009; ICEC 09; ACM.*
Search Report in PCT/EP2010/054275, Jun. 15, 2010.

* cited by examiner

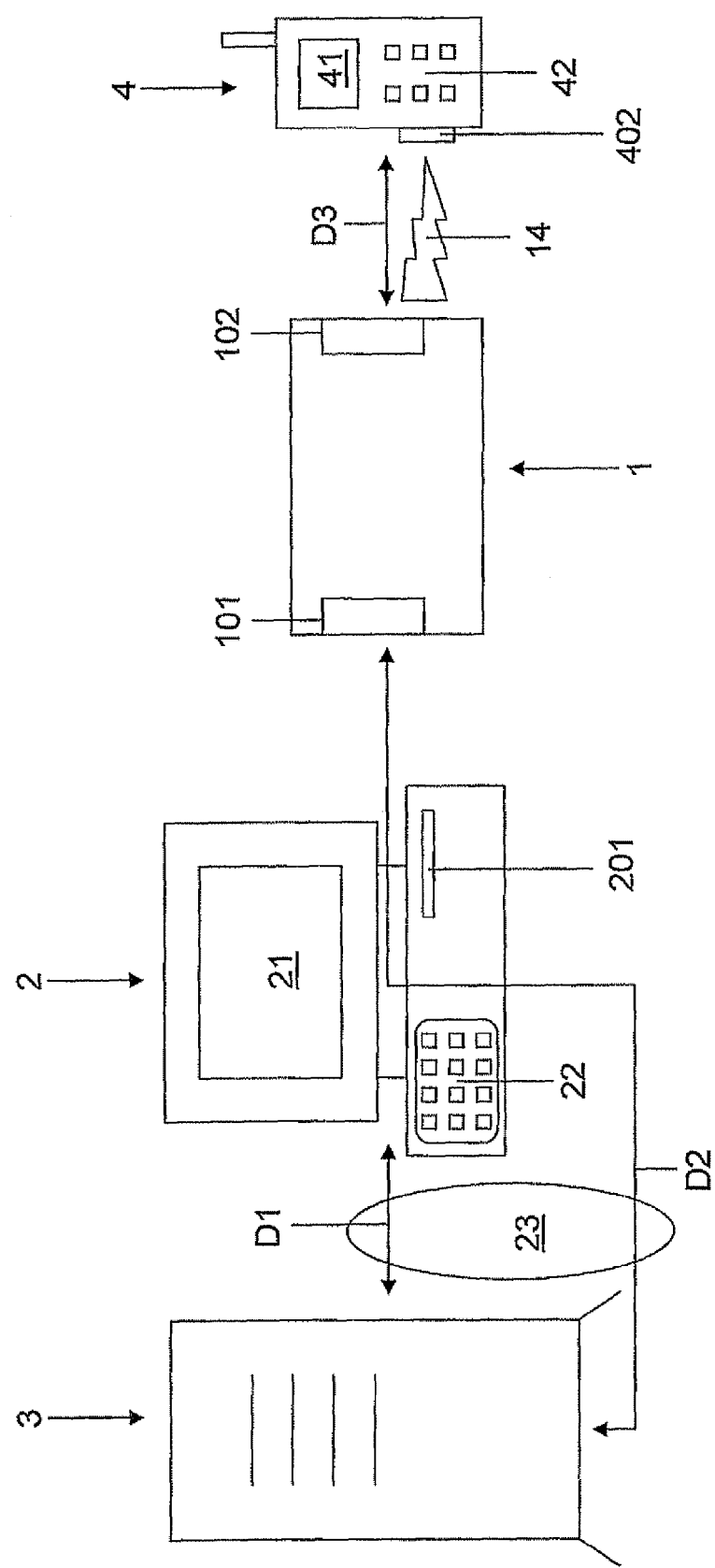

METHOD FOR CARRYING OUT AN APPLICATION WITH THE AID OF A PORTABLE DATA STORAGE MEDIUM

BACKGROUND OF THE INVENTION

1. Field of the Invention

The invention relates to a method for carrying out an application with the help of a portable data carrier as well as a corresponding portable data carrier.

2. Related Art

Personal portable data carriers are more and more used to make it possible for users to carry out software-based useful applications with the help of software to which the user has only limited access. The target of software-based useful applications typically is to change a data stock which is managed by a third party. An example of such software-based useful applications is in particular the carrying out of electronic transactions, such as banking transactions, via the Internet. Upon carrying out software-based useful applications, hereinafter referred to as applications, with interposition of a communication between a terminal and a server, there is the need of protecting the corresponding communication connections from manipulations by third parties. This plays a role in particular upon carrying out applications in the form of electronic transactions via the Internet.

From the prior art there are known various methods for protecting transactions against manipulations. Upon electronically carrying out banking transactions, there is used in particular the PIN/TAN method in various forms. Here, a user logs in with a PIN by means of his browser to the banking server of his bank and inputs via a corresponding data connection, which preferably is cryptographically secured, the transaction data of the transaction to be carried out. In the case of the simple TAN method, the user has received a list of multi-digit TAN numbers before, while the TAN numbers are also stored on the bank server. For completing a transaction, the user must input a corresponding yet unused TAN number from the list. The bank server then checks whether the TAN is valid, i.e. comes from the user's list and has not yet been used by the user. If so, the corresponding banking transaction is finally executed by the server.

In a further development of the above TAN method, the so-called iTAN method, the user's list of TAN numbers is indexed. In order to increase the security, for completing the transaction the user is prompted to input a TAN with a specific index number. An attacker having a TAN number from the list thus possibly has to make a multiplicity of attempts for carrying out a transaction, until the server finally requests the TAN with the index which the fraudster has at the disposal. By appropriately limiting the number of misentries, the security can be suitably increased.

In a further embodiment of an electronic TAN method, the so-called mTAN method, the TAN to be inputted has not been sent to the user before in the form of a list, but the server sends the TAN as an SMS message to a personal mobile phone of the user. For confirming the transaction, the user inputs the TAN transmitted to his mobile phone, which is shown to him on the display of this device, via the user interface of the computer on which he carries out the Internet banking. This method has further advantages, since an attacker has to obtain, by means of corresponding malicious software, control of both the computer on which the Internet banking is carried out and of the user's mobile phone. This method, however, has the disadvantage that upon inputting the TAN there occur delays which are caused by the sending of the TAN SMS to the mobile phone. In addition, for the user there arise additional costs from the transmission of the TAN SMS, because the fees for sending the SMS normally are charged to the user.

DE 10 2004046847A1 discloses a method for carrying out a transaction, which is executed by means of a chip card, a PC and a server. Starting out from the PC, transaction data are transmitted via a first data connection to a server, on the one hand, and passed on via a second data connection to the chip card, on the other hand. Via a third data connection the server furthermore sends authentication data to the chip card. The chip card carries out security checks with the data obtained and effects that data contained in the authentication data are displayed for checking by a user. The method has a high security, but requires an absolutely trustworthy display. Such can be provided in a suitable card-reader device, but then causes corresponding additional expenses. In a variant, the server sends the authentication data partly to a mobile phone, on the display of which there are represented data contained in the authentication data for checking by a user. In the no-error case, the user transmits authentication information contained in the authentication data via the PC to the chip card. Since a mobile phone display can be regarded as trustworthy, the variant further increases the security. However, it requires availability and use of a mobile phone network. Thus, the applicability of the method is limited, on the one hand, and the use of the mobile phone network causes effort and costs, on the other hand.

In the document WO 2008/046575 A1 there is described a method for carrying out an application with the help of a portable data carrier, in which the application is carried out with the help of a first and second terminal with interposition of the data carrier. The method can also be used in particular for executing electronic banking transactions. The communication carried out thereby always takes place with interposition of the portable data carrier. In the method, transaction data are first inputted via the first terminal, said first terminal being in particular a personal computer. Then the data are transmitted to the portable data carrier, which forwards these to a second terminal, e.g. to a mobile phone. The transaction must then be released by a user by means of an input at the second terminal, whereupon the transaction data are transmitted from the data carrier to a server which executes the transaction.

In the document US 2003/0087601 A1 there is described the use of a security token having two interfaces for the secured data transmission between a mobile phone and a PC. The token here communicates via a contactless interface, for example based on Bluetooth or infrared, with the mobile phone and via a contact-type interface with the PC.

SUMMARY OF THE DISCLOSURE

The object of the invention is to provide a method for carrying out an application with the help of a portable data carrier, which upon the execution of the application makes possible in a simple manner a secure data exchange between the components involved in the application.

In the method according to the invention, for carrying out the application there is used a personal portable data carrier which comprises two separate communication interfaces. In the method, there are transmitted specified input data, which have been inputted e.g. via a corresponding user interface of the first input device, by a user via a first terminal to a server via a first data connection between the first terminal and the server. The input data here are provided for processing by the application. Then authentication data for authenticating the application based on the input data received at the server are transmitted from the server via a second data connection between the server and the data carrier which has been connected via the first communication interface with the first terminal before. Finally, the authentication data are sent from the data carrier via a third data connection by means of the second communication interface to the second terminal. Upon confirmation of the authentication data by the user via the first or the second terminal, then corresponding confirmation data are transmitted to the server via at least the first or second data connection, whereupon the server executes the application. Upon confirmation of the authentication data via the first terminal, the confirmation data are transmitted in particular via the first data connection to the server. Upon confirmation of the authentication data via the second terminal, the confirmation data are transmitted preferably via the third and second data connection to the server.

Here and in the following a first or second or third data connection respectively means a data connection in which a continuous data channel is established, so that during normal operation there does not take place any modification of the data transmitted between the two components at the endpoints of the data connection. That is, when technical components are interposed upon the data transmission, these have only a forwarding function and do not serve to change or modify the data. In particular, the first terminal with which the data carrier is connected functions upon the transmission of data via the second data connection as a pure forwarding node to forward data between the data carrier and the server. The data connections can thus also be referred to as direct or immediate data connections between the components at the respective ends of the data connection.

The invention has the advantage that upon the carrying out of the application there are involved a plurality of components in the form of a server, a first terminal and a second terminal as well as a portable data carrier. This impedes the possibility of manipulations, because in the case of a security-critical attack there must be intercepted or influenced several components. Furthermore, the method according to the invention has the advantage that not the entirety of the data to be transferred is transported via the data carrier, but only authentication data or if necessary confirmation data, so that a data carrier with simple functionality can be used upon the data transmission. The method according to the invention can be easily realized, since for its setup there must be provided merely a correspondingly configured data carrier, while all other components are readily available. Technically suitable portable data carriers with two separate communication interfaces, generally, are also already known.

The method according to the invention is preferably used to carry out applications via the Internet, so that the first and/or the second data connection preferably comprises a data connection via the Internet. A particularly high security is achieved by using for the first or second data connection cryptographically secured data connections, for example based on the SSL/TLS encryption protocol sufficiently known from the prior art.

In a further, particularly preferred embodiment, as a second data connection there is used a data connection with interposition of a contact-type interface as a first communication interface, for example the USB interface sufficiently known from the prior art. In contrast to this, for the third data connection there is preferably used a data connection by means of a contactless interface as a second communication interface, in particular a short-range NFC interface (NFC=Near Field Communication) and/or a Bluetooth interface. By using short-range interfaces, the danger of manipulation of the transmitted data is further reduced. If necessary, it is also possible to cryptographically secure the third data connection, for example by using the SSL/TLS protocol already mentioned above.

The method according to the invention can be used in any first or second terminal, a terminal being understood to be a device which supports the corresponding, above-defined data connections. That is, the first terminal enables a communication via the first communication interface and the second terminal via the second communication interface. The terminals here have a user interface via which the user can communicate with the device. The first terminal is preferably a data processor or computer, in particular a personal computer. A personal computer normally has a well-operable user interface in the form of a keyboard and of a large screen, which has the advantage that data can be inputted very comfortable by the user. The second terminal, however, is preferably a mobile device, for example a mobile phone which a user normally always carries with him. The second terminal has, like the first, a user interface with output means, preferably in the form of a display or screen, as well as a data input unit in the form of a keyboard. Besides the form of a mobile phone, the second terminal can also have the form of a laptop, PDA and the like.

In an especially preferred embodiment, the portable data carrier is a chip card or a token. A token is a hardware component which is part of a system for identifying or authenticating a user. A token here can in particular have the form of a chip card. As chip cards there are preferably used so-called dual-interface cards, which have both a contact-type and a contactless interface, which in the method according to the invention are used as the first and second communication interface.

A particularly preferred application area of the method according to the invention is the carrying out of an electronic transaction, in particular carrying out electronic banking transactions. Here, as input data there are transmitted via the first data connection preferably transaction data for specifying the transaction to be carried out, for example corresponding data concerning the recipient of a bank transfer and the amount to be transferred.

In a further variant of the proposed method there is transmitted an identifier via the second and third data connection as authentication data, besides the identifier there is preferably also transmitted a summary of the application data received at the server. In the use case of the carrying out of an electronic transaction, the identifier is in particular a TAN number to authenticate the transaction, as it was mentioned above.

In a further variant of the method according to the invention, the identifier is outputted to the user on the second terminal, the identifier is in particular optically displayed to the user on the display of the terminal. A confirmation of the authentication data is effected here by the user inputting the outputted identifier via the first terminal, as confirmation data there being transmitted the inputted identifier via the first data connection to the server, which, if the received identifier corresponds with the identifier originally sent by it via the second data connection, executes the application.

In a further variant of the method according to the invention, the confirmation of the authentication data is effected by the user through an input at the second terminal, whereupon confirmation data are transmitted to the server via the third and second data connection. This variant has the advantage that the user does not have to perform an input at the first terminal. In particular, it can be ensured by suitable software, that the user merely has to input [sic] a predetermined operating key at the second terminal, so that one can do entirely without the inputting of a TAN by the user.

In a further preferred embodiment of the method according to the invention, the application is carried out with the help of a software program stored on the portable data carrier, in this case the data carrier comprises a corresponding mass memory for storing the software program. Here, the software program can be started by the user after the connection of the data carrier via the first communication interface with the first terminal. This makes it possible for a user to carry out the application on any first terminals having the user environment familiar to him.

Besides the above-described method, the invention further relates to a portable data carrier, in particular a chip card, comprising a first communication interface and a second communication interface, the data carrier being set up to carry out every variant of the method according to the invention described above.

Embodiments of the invention are explained in detail in the following with reference to the enclosed Figure.

DESCRIPTION OF THE DRAWINGS

FIG. 1 shows a schematic representation of the steps carried out in an embodiment of the method according to the invention and the components used therein.

DETAILED DESCRIPTION OF PREFERRED EMBODIMENTS OF THE INVENTION

The following description of the invention is based on an embodiment, in which the executed application is the secure execution of a transaction over the Internet. The components used comprise a personal portable data carrier 1, a so-called token, with two communication interfaces 101, 102 independent of each other. In the embodiment, the token 1 has the form of a chip card or smart card. There is advantageously used a so-called dual-interface card, which has a contact-type communication interface 101, on the one hand, and a contactless communication interface 102, on the other hand. The contact-type interface 101 can have the form of for example a USB interface according to the ISO 7816 standard. The contactless interface 102 in the embodiment of FIG. 1 is an interface for NFC communication (NFC=Near Field Communication), with which there can be contactlessly exchanged data over electromagnetic high-frequency fields over short ranges. The contactless interface 102 here is based on the ISO 14443 standard. Although the use of a contactless and a contact-type interface is expedient, the two communication interfaces 101, 102, of course, can also be realized according to other standards or in other combinations. For example, both communication interfaces 101, 102 can be formed in a contactless fashion.

Further components shown in FIG. 1 are a first terminal 2 in the form of a computer in the form of a PC 2 (PC=personal computer), a server 3, and a second terminal 4 in the form of an NFC-enabled, i.e. provided with an NFC-interface, mobile phone.

The PC 2 has a mating interface 101 corresponding to the communication interface 101 of the smart card 1, by means of which it is connected via the communication interface 101 with the smart card 1. It further has a user interface with a keyboard 22 and a screen 21. The PC 2 is further connected via a data network 23 with the server 3. The data network 23 in the embodiment is the Internet, but other networks, such as private networks with restricted access, such as of banks or government organisations are also possible.

The second terminal 4 has, corresponding to the second communication interface 102 of the smart card 1, an interface 402 for establishing data connections via a data transmission path 14 independent of the data network 23. Expediently, the data transmission path 14 is configured as a local data network and realized preferably in the form of an NFC communication. The use of an NFC communication has the advantage that because of the low field range of the communication the risk of interception upon a data transmission is very low. The interface 402 in the embodiment has the form of an NFC communication interface, the data network 14 an NFC connection. The second terminal 4 further has, like the first, a user interface with output means 41, preferably in the form of a display or screen, as well as a data input unit in the form of a keyboard 42. The smart card 1 is connected by means of the communication interface 102 via the separate data transmission path 14, i.e. the NFC connection, with the second terminal 4, i.e. the mobile phone 4. For further protection, the data transmission between the smart card 1 and the mobile phone 4 can further be effected in an encrypted manner.

The target of the method is to carry out an application, the method being explained by way of example for carrying out a banking transaction via Internet banking. For carrying out such a transaction, a user at the PC 2 first logs via his browser onto the server 3 of his bank, so that a data connection D1 between PC 2 and bank server 3 is established via the Internet. In particular, a cryptographically secured data connection over the sufficiently known SSL/TLS protocol is established here.

For carrying out the transaction via the bank server 3 the user inputs via the user interface, i.e. via a keyboard in combination with a screen, specified input data, i.e., transaction data in the browser of the PC 2. The transaction data can be for example banking data of a remittee, an amount of money to be remitted and a reference. The inputted transaction data are transmitted via the first data connection D1 to the server 3.

For confirming the inputted transaction data, there is required the presentation of a transaction-specific secret identifier by the user, which is unequivocally associated with this transaction and which is based on the transmitted transaction data. The identifier, e.g. a TAN, is provided by the server 3 and must be transmitted to the user. For this purpose, the user connects the smart card 1 via the communication interface 101 with the corresponding mating interface 201 of the PC 2. Subsequently, there is established via the same data network 23 via which the first data connection D1 has been established, in the embodiment via the Internet, between the smart card 1 and the server 3 a further secure data connection D2. The PC 2 involved in the second secured data connection acts merely as a router here which only forwards data without modifying them. To achieve this and to secure the data connection D2 there is preferably again used an encryption based on the SSL/TLS protocol. Encrypting the second data connection D2 has the advantage that malicious software on the PC 2 can neither intercept this connection nor selectively manipulate the contents running over this connection.

Via the second data connection D2 the bank server 3 then sends a corresponding identifier, e.g. a TAN, to the smart card 1. Together with the identifier, the bank server 3 expediently also transmits a summary of the transaction data received via the first data connection D1 before to the smart card 1.

The smart card 1 now further transfers the identifier and, if any, the summary of the transaction data by means of the second interface 102 to the mobile phone 4 belonging to the user. For this purpose, the smart card 1 establishes by means of the second communication interface 102 via the separate data transmission path 14, which is configured as NFC communication, a third, contactless data connection D3 to the mobile phone 4. Via this the smart card 1 then passes on the data to the mobile phone 4. On the display 41 of the mobile phone 4 the user can then check the transaction data in order to possibly recognize errors inputted by him or manipulations effected upon the transmission and to cancel the transaction. On the screen, there is also displayed to the user the identifier, e.g. the TAN, for the transaction.

If the transaction data displayed on the screen of the mobile phone 4 are correct, the user can input as a confirmation the identifier displayed on the mobile phone 4, i.e. e.g. the TAN, via the browser at the PC 2 on the corresponding website of the bank server 3, whereupon the identifier is transmitted via the data connection D1 to the server 3. If the server 3 determines that the identifier sent before via the data connection D2 corresponds with the identifier received now via the data connection D1, the desired application, in the embodiment the electronic transaction, is finally executed by the server 3. The user receives via the browser window a corresponding feedback.

Like in the known mTAN method, in which the TAN is transmitted via SMS to the mobile phone, the security of the method according to the invention is based on the fact that it is very difficult for an attacker to manipulate two independent terminals, e.g. both a personal computer 2 and in addition a mobile phone 4. The security in the method according to the invention is also increased, because as an additional component there is used a smart card 1 associated to the user. Furthermore, the described method has the advantage that the identifier, i.e. the TAN, reaches the mobile phone 4 not via the sending of an SMS, and thus via a further data network, so that for the user and/or the server operator there do not accrue any additional costs for the use of a second data network. Rather, there is used only one single data network and realized one additional connection with the help of a personal portable data carrier, which by means of an additional communication interface makes accessible an easily available local data connection to an also easily available second terminal. Furthermore, the method described here can be carried out faster, because the time delay, usually present when sending an SMS, until the receipt of the SMS does not occur, so that the user can complete the transaction faster.

The method described with reference to FIG. 1 can be suitably expanded and complemented. The smart card 1 may thus additionally include a mass storage, on which there is stored a corresponding software for carrying out the Internet banking. This software can then be started after the connection of the smart card 1 via the first interface 101 to the PC 2 and allows the user to display his usual work environment also on PCs 2 which he does not use regularly to carry out Internet banking. In addition, for processing the transaction data received on the mobile phone 4 there can be used a separate application instead of the software already present on the mobile phone. With such an application it is possible that for example the transaction is not confirmed by inputting a corresponding TAN at the PC 2, but by the user pressing a corresponding key or key combination on his mobile phone 4 to confirm the transaction. In this case typing the TAN is no longer required.

The above-described method further has the advantage that only TAN-related information is transported over the smart card 1. The software on the smart card 1 may therefore have a low functionality, since it substantially passes data through to the mobile phone 4. For this, only slight changes have to be made to the websites of the bank server 3. The server 3 only needs to know upon the transmission of the authentication data that it must send the transaction data and a TAN matching these to the smart card 1. It may also be possible here that via the server 3 there can be carried out both transactions with conventional TAN lists, which were transmitted to the user before, and transactions with interposition of the smart card 1. According to this variant, the server 3 only must check whether the user logged in on it uses the conventional TAN method by means of a list or uses the TAN transmission via the smart card 1. In the first case the server 3 requests a corresponding TAN from the list, and in the second case the server 3 transmits a TAN to the smart card 1.

The invention claimed is:

1. A method for carrying out an application with the help of a portable data carrier, wherein the data carrier comprises a first communication interface and a second communication interface, and wherein for carrying out the application there is required a communication with a server comprising the steps:
    establishing a first data connection between a first terminal and the server via a data network,
    transmitting specified input data from the first terminal to the server via the first data connection, the specified input data being provided for processing the application,
    connecting the data carrier with the first terminal via the first communication interface of the data carrier,
    establishing a second data connection between the data carrier and the server via the data network and the first terminal,
    transmitting an identifier as authentication data from the server to the data carrier via the second data connection, the authentication data being provided for authenticating the application based on the specified input data,
    establishing a third data connection between the data carrier and a second terminal via the second communication interface of the data carrier, the second communication interface being a contactless interface,
    transmitting the authentication data from the data carrier to the second terminal via the third data connection,
    outputting data contained in the authentication data through the second terminal for checking,
    transmitting confirmation data to the server via at least the first or second data connection upon receiving confirmation of the authentication data via the first or the second terminal, and
    executing the application by the server,
    wherein the identifier is outputted to the user on the second terminal, a confirmation of the authentication data is effected by the user inputting the outputted identifier via the first terminal, and as confirmation data, there is transmitted the inputted identifier via the first data connection to the server, and, in response to the received identifier corresponding with the identifier originally transmitted via the second data connection, executing the application by the server.

2. The method according to claim 1, wherein the first and/or the second data connection comprises a data connection via the Internet.

3. The method according to claim 1, wherein the second data connection is a data connection with interposition of a contact-type interface as the first communication interface.

4. The method according to claim 1, including securing by encryption the third data connection.

5. The method according to claim 1, including using a computer as the first terminal.

6. The method according to claim 1, including using a mobile terminal as the second terminal.

7. The method according to claim 1, including using a chip card and/or a token as the portable data carrier.

8. The method according to claim 1, wherein the application is an electronic transaction.

9. The method according to claim 8, including transmitting as input data transaction data for specifying the transaction to be carried out via the first data connection.

10. The method according to claim 1 including transmitting via the second and third data connection the identifier as authentication data.

11. The method according to claim 1, including effecting by the user the confirmation of the authentication data through an input at the second terminal, whereupon confirmation data are transmitted to the server via the third and second data connections.

12. The method according to claim 1, including carrying out the application with the help of a software program stored on the data carrier, which is started by the user after the connection of the data carrier via the first communication interface with the first terminal.

13. A portable data carrier, comprising: a first communication interface, a second communication interface, and a memory unit,
   wherein the memory unit has stored thereon computer executable instructions which, when executed by one or more processors, implements a method of carrying out an application, the method including the steps:
   establishing a first data connection between a first terminal and a server via a data network,
   transmitting specified input data from the first terminal to the server via the first data connection, the specified input data being provided for processing the application, connecting the data carrier with the first terminal via the first communication interface of the data carrier, and
   establishing a second data connection between the data carrier and the server via the data network and the first terminal,
   transmitting an identifier as authentication data from the server to the data carrier via the second data connection, the authentication data being provided for authenticating the application based on the specified input data,
   establishing a third data connection between the data carrier and a second terminal via the second communication interface of the data carrier, the second communication interface being a contactless interface,
   transmitting the authentication data from the data carrier to the second terminal via the third data connection,
   outputting data contained in the authentication data through the second terminal for checking,
   transmitting confirmation data to the server via at least the first or second data connection upon receiving confirmation of the authentication data via the first or the second terminal, and
   executing the application by the server,
   wherein the identifier is outputted to the user on the second terminal, a confirmation of the authentication data is effected by the user inputting the outputted identifier via the first terminal, and as confirmation data, there is transmitted the inputted identifier via the first data connection to the server, and, in response to the received identifier corresponding with the identifier originally transmitted via the second data connection, executing the application by the server.

* * * * *